Nov. 20, 1923.

J. I. McCORMICK

BUMPER

Filed June 7, 1923

Inventor:
John I. McCormick,
by his Attorneys,

Nov. 20, 1923.	1,474,907
J. I. McCORMICK
BUMPER
Filed June 7, 1923   2 Sheets-Sheet 2

Inventor:
John I. McCormick
by his Attorneys
Howson & Howson

Patented Nov. 20, 1923.

1,474,907

UNITED STATES PATENT OFFICE.

JOHN I. McCORMICK, OF PHILADELPHIA, PENNSYLVANIA.

BUMPER.

Application filed June 7, 1923. Serial No. 643,894.

*To all whom it may concern:*

Be it known that I, JOHN I. MCCORMICK, a citizen of the United States, residing in Philadelphia, Pennsylvania, have invented certain Improvements in Bumpers, of which the following is a specification.

My invention relates to certain improvements in the construction of bumpers used at the front and at the rear of automobiles and other vehicles.

One object of the invention is to provide a plate spring of such form that it will hold the bumper in position, but which will yield on receiving a blow from the front or from the rear.

A further object of the invention is to construct the bumper so that it can be readily adjusted and applied to automobiles of different constructions.

Figure 1:
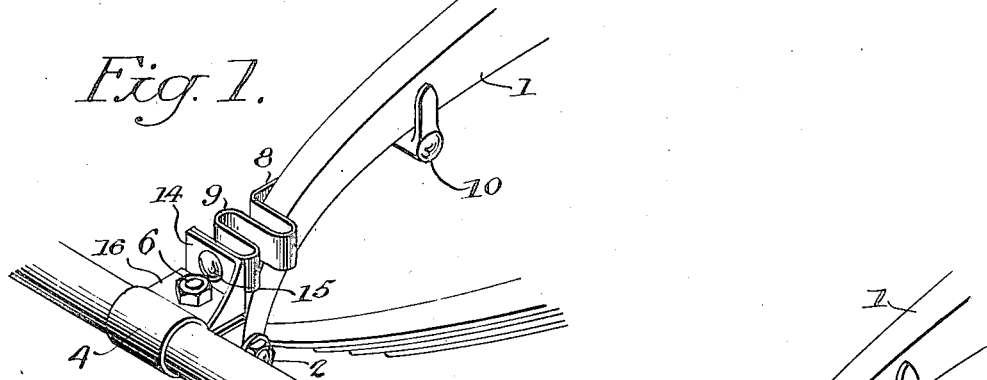
Fig. 1 is a perspective view illustrating my improved bumper.

Referring to the drawings, 1, 1 are the side frames of an automobile. 2 are bolts that attach the front ends of the front springs to the frames. 5 is the bumper made of tubular material in the present instance. 4 are the clamps, which are secured to the bumper. 3 are the arms connecting the clamps to the bolts 2. 8 are the plate springs that are attached to the clamps 4 and to the frames 1.

Figure 4:
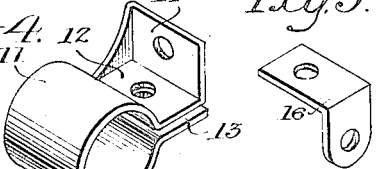
Figs. 4, 5 and 6 are perspective views of parts of the bumper.
Figure 5:
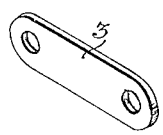
Figures 6, 11:
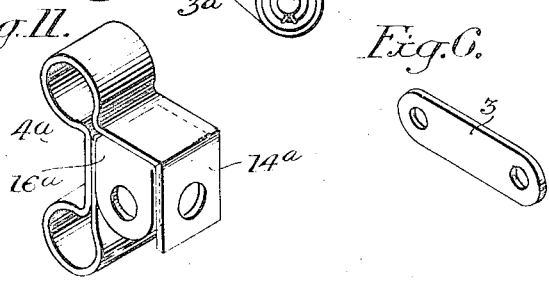

Referring to Figs. 1 to 6, inclusive, the clamps are made of wrought metal, bent into shape, as shown in Fig. 4, in which 11 designates a band that encircles the bumper 5. 12 and 13 designate extensions through which the clamping bolt 6 passes. The extension 12 is bent at right angles, as shown at 14, and forms a bracket to which the plate spring is attached by a bolt 15. An angle plate 16, Fig. 5, is secured to the extension by the bolt 6. The arm 3 is pivoted to this plate 16 by a bolt 17.

The arms 3 are made of sheet metal. As they are comparatively thin, they can be attached to the frame by the bolts 2 of ordinary length.

Figure 9:
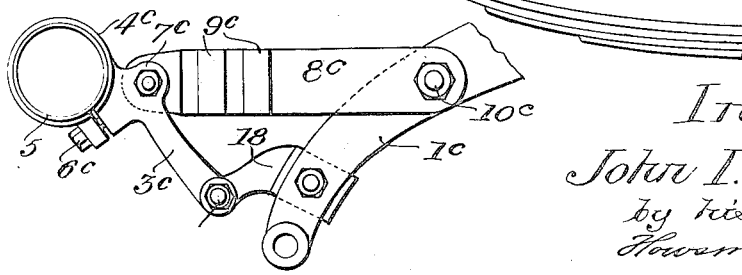
Figs. 9, 10 and 11 are views of modifications of the invention.

The plate springs 8 are made as shown in Fig. 1, and are corrugated at 9 directly back of the clamps. The rear end of each spring may be attached to the frame by a clip 10, as in Figs. 1 and 2, or may be attached directly to the frame by a bolt $10^c$, as shown in Fig. 9.

The clamps can be readily adjusted to the bumper and the springs can be secured to the clamps at any angle desired, depending upon the construction of the automobile to which the bumper is to be attached.

Figure 10:
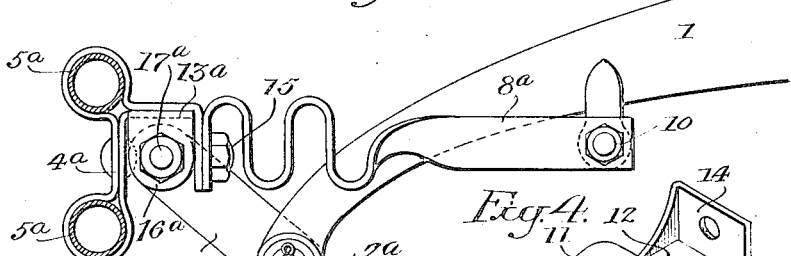

The spring can be arranged with the corrugations in a horizontal plane, as in Fig. 1, or it may be arranged in a vertical plane, as shown in Fig. 10. The rear end of the spring $8^a$ is shown twisted to fit the automobile frame. In some instances, the rear end of the spring may be secured to other parts of the automobile, such as the wheel fender bracket, if desired.

In Fig. 10, the clamp $4^a$ is shown shaped to hold two bumper bars $5^a$ and the angle plate is dispensed with. A bracket $16^a$ is bent from the extension 13 to which the arm $3^a$ is attached and the bracket $14^a$ is bent down, making a compact and substantial construction.

Figure 8:
Fig. 8 is a detached perspective view of part of the arm shown in Fig. 7.
Figure 7:
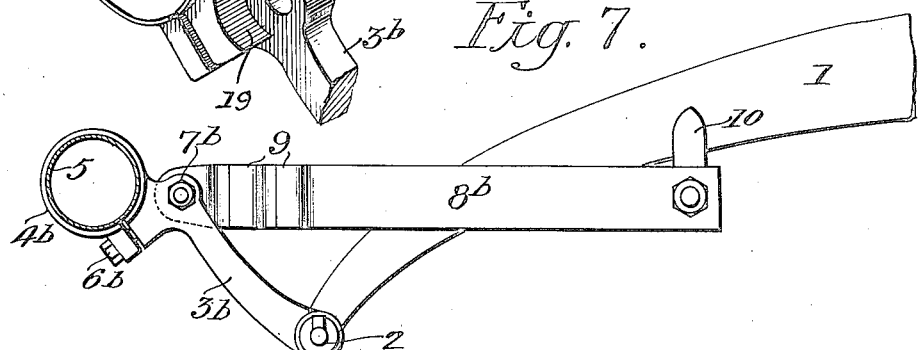
Fig. 7 is a side view illustrating a modification of the invention.

In Figs. 7 and 8, a modification of the invention is illustrated, in which the clamp $4^b$ is in the form of a split ring made as an integral part of the arm $3^b$. In this instance, the spring $8^b$ is attached directly to the arm by a bolt $7^b$. The outer end of the spring is rounded and fits a socket 19 in the arm, Fig. 8.

In Fig. 9, the arm $3^c$ is attached to a bracket 18, which is secured to the frame $1^c$. The rear end of the spring is attached directly to the frame by a bolt $10^c$, as hereinbefore mentioned.

Figure 2:
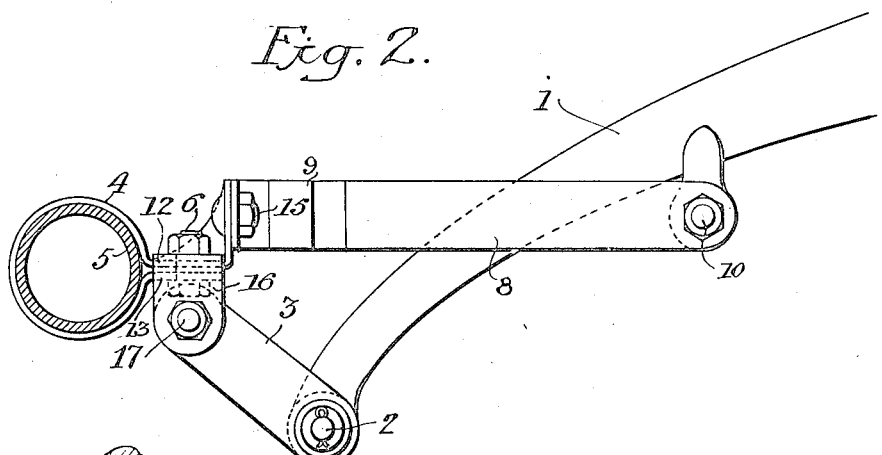
Fig. 2 is a side view.
Figure 3:
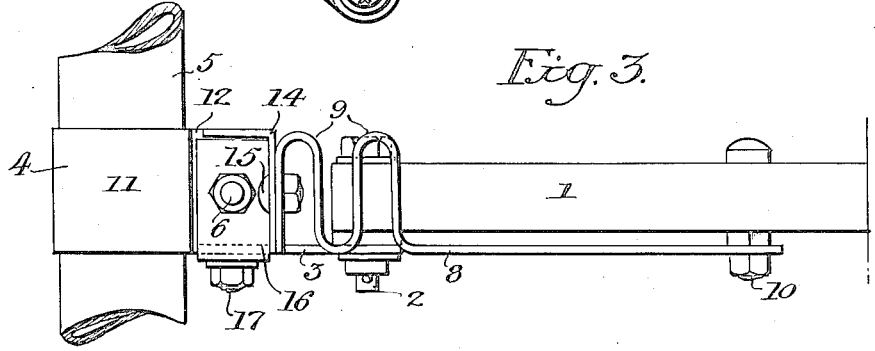
Fig. 3 is a plan view.

By making the clamps of sheet metal, as shown in Figs. 2 and 10, they can be shaped to fit bumper bars of different forms.

I claim:

1. The combination of a bumper bar; arms on which the bar is pivotally mounted; and corrugated plate springs located back of the bumper bar.

2. The combination of a frame of an automobile; arms pivoted to the frame; clamps at the outer ends of the arms; a bumper bar secured to the clamps; and corrugated plate springs connecting the clamps with the frame some distance from the pivots of the arms.

3. The combination of a bumper bar; clamps secured to said bar; arms connecting the clamps with a vehicle; and corrugated plate springs also connecting the bumper bar to the same vehicle.

4. The combination of the frame of a vehicle; a bumper bar; wrought metal clamps attached to the bumper bar; extensions on each clamp, one extension having a bracket; a corrugated plate spring attached to the bracket and to the frame of the vehicle; and an arm connecting the clamps to the vehicle some distance from the connection of the spring.

5. The combination of the frame of an automobile; a bumper bar; wrought metal clamps secured to the bumper bar; an extension on each clamp; an angle plate; a bolt securing the plate to the extension of the clamp and acting to secure the clamp to the bumper bar, one extension having a bracket; a corrugated plate spring attached to the bracket and to the frame of the automobile; and a thin metal arm pivoted to the angle plate and to the spring bolts of the automobile.

6. The combination of the frame of an automobile; a bumper bar; arms supporting said bumper bar; and a corrugated plate spring connected to the bumper bar at each arm, said connection being such as to enable the springs to be turned to accommodate themselves to the bar and to the frame of the automobile.

JOHN I. McCORMICK.